US012704980B2

(12) United States Patent
Chen et al.

(10) Patent No.: US 12,704,980 B2
(45) **Date of Patent: *Aug. 11, 2026**

(54) SYSTEM AND METHOD FOR MANAGING SOLID STATE STORAGE DEVICES IN LOW TEMPERATURE ENVIRONMENT

(71) Applicant: InnoGrit Technologies Co., Ltd., Shanghai (CN)

(72) Inventors: Lin Chen, Cupertino, CA (US); Gang Zhao, Chandler, AZ (US); Wei Jiang, Fremont, CA (US); Zining Wu, Los Altos, CA (US)

(73) Assignee: InnoGrit Technologies Co., Ltd., Shanghai (CN)

( * ) Notice: Subject to any disclaimer, the term of this patent is extended or adjusted under 35 U.S.C. 154(b) by 309 days.

This patent is subject to a terminal disclaimer.

(21) Appl. No.: 18/516,913

(22) Filed: Nov. 21, 2023

(65) Prior Publication Data

US 2024/0086089 A1 Mar. 14, 2024

Related U.S. Application Data

(63) Continuation of application No. 17/227,283, filed on Apr. 10, 2021, now Pat. No. 11,861,186.

(51) Int. Cl.
*G06F 3/06* (2006.01)
*G06F 1/20* (2006.01)

(52) U.S. Cl.
CPC ............ *G06F 3/0625* (2013.01); *G06F 1/206* (2013.01); *G06F 3/0653* (2013.01); *G06F 3/0679* (2013.01)

(58) Field of Classification Search
CPC .................................................... G06F 3/0625
See application file for complete search history.

(56) References Cited

U.S. PATENT DOCUMENTS

| | | | | |
|---|---|---|---|---|
| 9,405,356 | B1 * | 8/2016 | Sareen | G06F 3/0674 |
| 11,630,587 | B2 * | 4/2023 | Kwon | G06F 11/2015 711/162 |
| 2015/0085594 | A1 * | 3/2015 | Dong | G06F 13/1668 365/222 |
| 2019/0378565 | A1 * | 12/2019 | Yuan | G11C 7/04 |

FOREIGN PATENT DOCUMENTS

| | | | | |
|---|---|---|---|---|
| CN | 109273029 A * | 1/2019 | | G06F 3/0688 |
| WO | WO-2018068638 A1 * | 4/2018 | | G11C 7/04 |

* cited by examiner

*Primary Examiner* — Suresh Suryawanshi
(74) *Attorney, Agent, or Firm* — IPro, PLLC

(57) ABSTRACT

Systems, apparatus and methods are provided for low temperature management of a storage system. An apparatus may include a temperature sensor to generate a temperature reading, a timer configured with a time interval, a backup battery, one or more non-volatile memory (NVM) devices and a storage controller. The storage controller may be configured to: maintain a standby mode for low temperature management until a host electronic system has been turned off, start the timer and check the temperature reading when the host electronic system is turned off, determine that the temperature reading is below a temperature threshold, set the time interval based on the temperature reading, receive an interrupt from the timer when the timer counts to the time Interval, and perform low-temperature management operations for data stored in the one or more NVM devices using power supplied by the backup battery.

20 Claims, 3 Drawing Sheets

SYSTEM AND METHOD FOR MANAGING SOLID STATE STORAGE DEVICES IN LOW TEMPERATURE ENVIRONMENT

TECHNICAL FIELD

The disclosure herein relates to the solid state storage device management, particularly relates to thermal management for solid state storage devices in low temperatures.

BACKGROUND

In modern storage technology, the performance and reliability of solid state storage systems based on non-volatile memory (NVM) devices have demonstrated great dependency on temperature. On one hand, increased access frequency and intensity may cause the system and individual semiconductor chips to overheat, which requires a range of thermal solutions to cool down the whole system and individual components. On the other hand, in extremely low temperature, the NVM devices begin to experience data loss, which can cause serious problems from user data loss to a dysfunctional operating system in an infotainment system.

The data loss issue in a low temperature environment has generally limited mass adoption of solid state storage devices to automobile applications. For example, during the wintertime in places where the temperature often goes below −40° C., the data loss may begin to happen after one day of parking a vehicle outside. Unless the vehicle is used on a daily basis, any extended parking period will make the data loss unpreventable, which in turn makes the solid state storage devices an undesired storage solution for automobile applications. Therefore, improving reliability of solid state storage devices in a low temperature environment is crucial for the automobile industry to adopt solid state storage devices for infotainment systems.

SUMMARY

The present disclosure provides a storage system adapted for a low temperature environment and a method to enhance data retention in low temperature applications. The storage system may include a timer, a temperature sensor and a removable backup battery. The timer and temperature sensor may enable an adaptive scheme to set a refresh frequency based on the environment temperature and the main electronic system power off time, and the backup battery may provide a dedicated power supply for low-temperature management operations without draining the main power source (e.g., the main battery of a vehicle). The low-temperature management operations may further include a data back-up scheme to further retain critical programs and user data, and a user notification step to suggest action items to users for preventing potential data loss.

In one exemplary embodiment, there is provided an apparatus that may comprise: a temperature sensor to generate a temperature reading, a timer configured with a time interval, a backup battery, one or more non-volatile memory devices and a storage controller. The storage controller may be configured to: maintain a standby mode for low temperature management until a host electronic system has been turned off and start the timer when the host electronic system is turned off, check the temperature reading from the temperature sensor when the host electronic system is turned off, determine that the temperature reading is below a temperature threshold, set the time interval on the timer based on the temperature reading, receive an interrupt from the timer when the timer counts to the time Interval, and perform low-temperature management operations for data stored in the one or more non-volatile memory devices using power supplied by the backup battery.

In another exemplary embodiment, there is provided a method for managing a solid state storage device in a low temperature environment. The method may comprise: maintaining a standby mode for low temperature management until a host electronic system has been turned off, checking a temperature reading from a temperature sensor when the host electronic system is turned off, determining that the temperature reading is below a temperature threshold, setting a time interval on a timer based on the temperature reading, using the timer to count how long the host electronic system has been turned off, sending an interrupt to a storage controller of the solid state storage device from the timer when the timer counts to the time Interval and performing low-temperature management operations using power supplied by a backup battery.

In yet another exemplary embodiment, there is provided a method for managing a solid state storage device in a low temperature environment. The method may comprise: setting a time interval on a timer based on a known environment temperature reading, maintaining a standby mode for low temperature management until a host electronic system has been turned off, using the timer to count how long the host electronic system has been turned off, sending an interrupt to a storage controller of the solid state storage device from the timer when the timer counts to the time Interval, and performing low-temperature management operations using power supplied by a backup battery.

DETAILED DESCRIPTION

Figure 1:
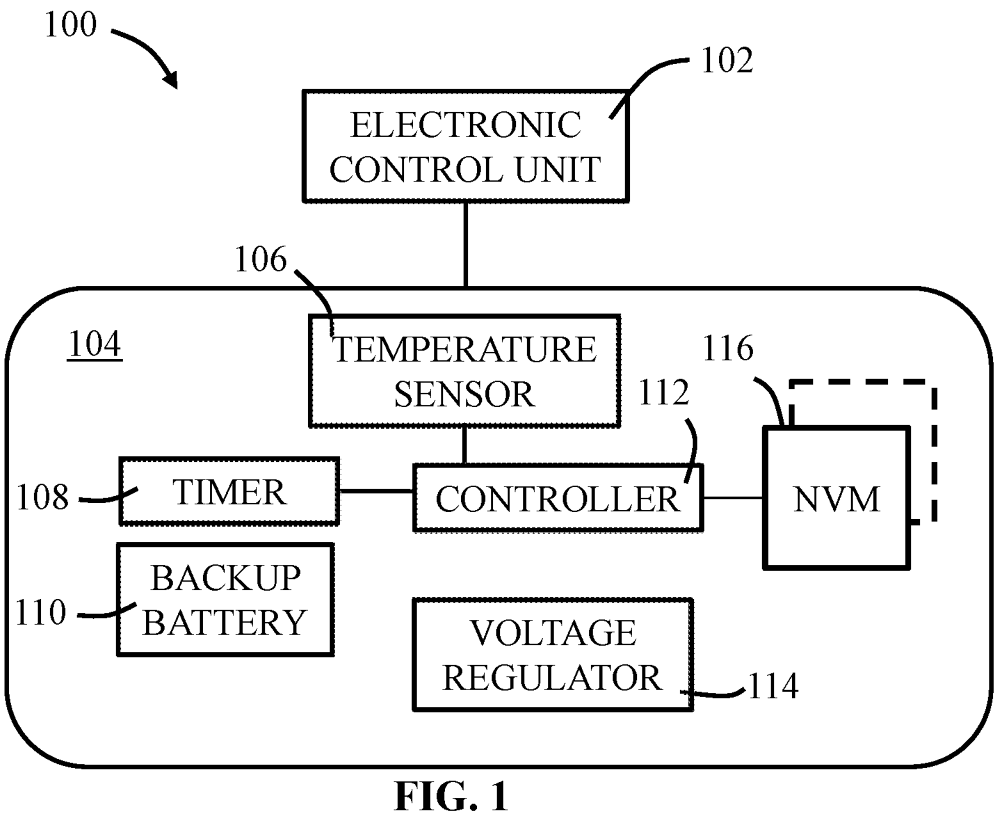
FIG. 1 schematically shows an electronic system adapted for working in a low temperature environment in accordance with an embodiment of the present disclosure.

Specific embodiments according to the present disclosure will now be described in detail with reference to the accompanying figures. Like elements in the various figures are denoted by like reference numerals for consistency.

The present disclosure provides systems and methods for a non-volatile storage system adapted to work in low temperatures. FIG. 1 schematically shows an electronic system 100 in accordance with an embodiment of the present disclosure. The electronic system 100 may comprise an electronic control unit 102 and a solid state storage device 104. The solid state storage device 104 may comprise a temperature sensor 106, a timer 108, a backup battery 110, a storage controller 112, a voltage regulator 114 and one or more non-volatile memory (NVM) devices 116. The electronic system 100 may be referred to as a host electronic system for the solid state storage device 104. In some embodiments, the electronic system 100 may be an electronic system for a vehicle (e.g., engine management, ignition, radio, carputers, telematics, and/or in-car entertainment) and may be turned on when the ignition of the vehicle is turned on and turned off when the ignition of the vehicle is turned off. It should be noted that ignition on or off may refer to whether a vehicle's main power system is on or off, regardless of whether the vehicle is a combustion engine vehicle, an electric vehicle or a hybrid vehicle.

The NVM devices 116 may provide non-volatile data storage for the solid state storage device 104. In some embodiments, the NVM devices 116 may be one or more NAND flash devices. In some other embodiments, the NVM devices 116 may be one or more other types of non-volatile storage devices, for example, NOR flash memories, magnetoresistive random Access Memory (MRAM), resistive random access memory (RRAM), phase change random access memory (PCRAM), Nano-RAM, etc.

The temperature sensor 106 may measure the environment temperature and periodically send out temperature reading data to the storage controller 112. It should be noted that although FIG. 1 shows the temperature sensor 106 as part of the solid state storage device 104, in some embodiments, the temperature sensor 106 may be an existing temperature sensor of an electronic system of a vehicle. For example, it is common for a modern vehicle to have a temperature sensor to measure environment temperature and display the measured environment temperature to drivers. In these embodiments, the temperature sensor 106 may be coupled to the electronic control unit 102. In one embodiment of these embodiments, the electronic control unit 102 may set the time interval for the timer 108 based on the measured environment temperature. In another embodiment of these embodiments, the electronic control unit 102 may pass the measured environment temperature to the storage controller 112 and let the storage controller 112 set the time interval for the timer 108 based on the measured environment temperature.

The voltage regulator 114 may be configured to adapt the power provided by a power source (e.g., the backup battery 110) for circuits of the solid state storage device 104. In some embodiments, the solid state storage device 104 may have more than one voltage regulator.

The storage controller 112 may be configured to control and manage the NVM devices 116 and other components of the solid state storage device 104. In some embodiments, the storage controller 112 may implement functionalities of a solid state drive (SSD) controller, and also low-temperature management operations (e.g., refresh, data back-up and user notifications). In at least one embodiment, the solid state storage device 104 may include a firmware that includes executable instructions to manage the solid state storage device 104. For example, the storage controller 112 may comprise a computer processor (e.g., a microprocessor or a microcontroller) configured to execute the executable instructions of the firmware to perform various operations for managing data in the NVM devices 116 (e.g., regular operations of a SSD controller and low-temperature management operations).

The timer 108 may be set with a time interval that may be configurable based on the environment temperature. In various embodiments, the timer 108 may be coupled to the electronic control unit 102. In an implementation example, the timer 108 may stay off while the electronic system 100 is on (e.g., vehicle ignition is on), and may be turned on (e.g., start counting time) after the electronic system 100 is turned off. When the counted time reaches the time interval (or end of the time interval depending on whether the timer counts from zero to the time interval or from the time interval to zero), the timer 108 may send an interrupt to the storage controller 112 to wake up the storage controller 112 to perform low-temperature management operations. While the interrupt is asserted to the storage controller 112, the timer 108 may be reset and re-start counting time again. Another interrupt may be sent to the storage controller 112 after the counted time reaches the time interval again. The operations of re-starting to count time and sending an interrupt may be repeated as long as the ignition is off.

In some embodiments, the time interval may be set based on the environment temperature. For example, to make the low-temperature management effective and efficient, the time interval between operations may be a function of the temperature: the time interval is small when the temperature reading is low and the time interval is large when the temperature reading is high. That is, the time interval may be increased for a higher environment temperature. As an example, the time interval may be in the order of hours (e.g., 6 hours) when the environment temperature lowers to −40° C. but in the order of days when the environment temperature rises above −10° C. In one embodiment, at room temperature, the low-temperature management operations may be suspended. For example, at room temperature, the time interval may be set to infinite or the timer 108 may be deactivated (e.g., turned off).

In addition to environment temperature, the time interval may also depend on a variety of factors that represent the durability and lifetime of the solid state storage device 104. In some embodiment, these factors may include the program/erase (P/E) cycle counts, the page error count and the program time. For example, a large P/E cycle count or page error count may indicate that the solid state storage device 104 may have entered the late stage of its lifetime, and thus a smaller time interval may be needed to ensure data retention.

In some embodiments, the temperature reading by the temperature sensor 106 may be monitored continuously (e.g., by the storage controller 112, the electronic control unit 102, or both) and the time interval may be set or adjusted (e.g., by the storage controller 112, the electronic control unit 102, or both) based on a detected temperature change that reaches or exceeds a temperature change threshold. For example, if there is no significant change in temperature, the present time interval may be maintained. However, if a significant change of temperature is detected, the time interval may be set to a new value based on the new temperature reading and the low-temperature management operations may be performed according to the new time interval. As an example, a significant change in temperature may be defined as a temperature equal to or exceed the temperature change threshold (e.g., 5° C.).

In some embodiments, the backup battery 110 may provide a dedicated power supply to the solid state storage device 104 for the low-temperature management operations. The dedicated power supply for the solid state storage device 104 may help relieve a main battery for the electronic system 100 (e.g., the main battery of the vehicle) from heavy duties of the refresh and back-up operations, and thus may prevent the main battery from being drained quickly during ignition off time. The backup battery 110 may be recharged in place, or recharged after being removed. Therefore, the user has the convenient option to recharge the backup battery 110 instead of replacing the bucky main battery. In some embodiments, the battery level of the removable backup battery 110 may be reported to the storage controller 112, the electronic control unit 102, or both. In one of such embodiments, the battery level may be reported to a user by a user notification, such that the user may be notified in a timely manner of further necessary actions or pending risks.

In various embodiments, the low-temperature management operations may include refresh and back-up. In some embodiments, the electronic system 100 may also be configured to send notifications to a user (e.g., by wireless connections such as Bluetooth, 3G/4G/5G or other wireless technology) using Simple Text Message (SMS), E-mail or mobile application in-app messages. In such embodiments, in addition to refresh and back-up, the low-temperature management operations may also include user notifications.

In a refresh operation, the storage controller 112 may read data from the one or more NVM devices 116, correct errors through controller's ECC schemes and re-program the data into the NVM devices 116. In a back-up operation, in contrast, the storage controller 112 may read the data, correct errors and program the data to a second location of the NVM devices 116. As a result, a second copy of the data may be retained at a different physical block after a back-up operation. In some embodiments, for the low-temperature management operations, the storage controller 112 may be configured (e.g., by firmware) to prioritize and selectively back-up data for the operating system, critical programs and important user data.

In embodiments that provide user notifications, the user notification operations may be performed at the same or different intervals as the refresh and back-up operations. Exemplary notifications may include the battery level of the backup battery 110, and one or more suggested action items, such as, but not limited to, charging the backup battery 110, turning on the vehicle for a short time and moving the vehicle to an indoor garage to prevent potential data loss.

Figure 2:
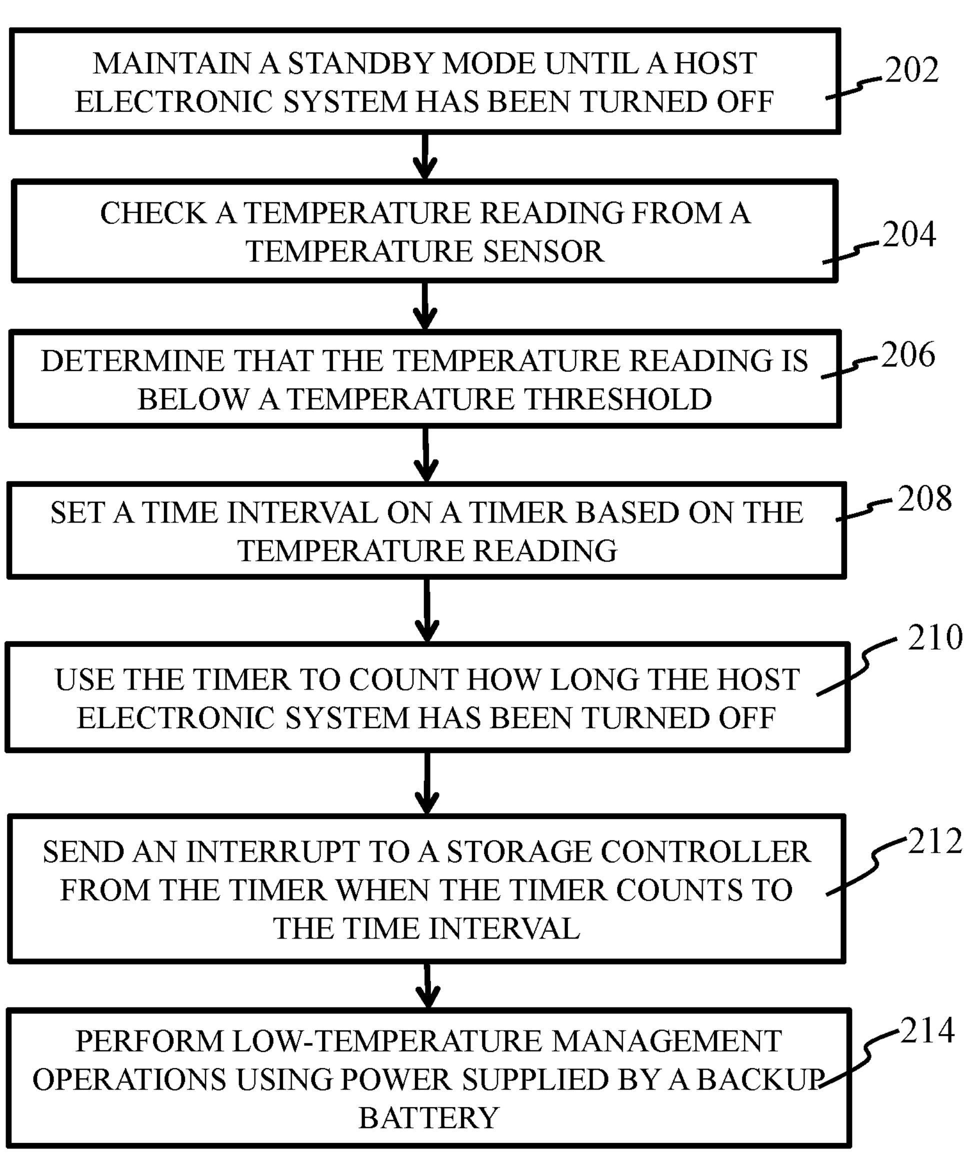
FIG. 2 is a flowchart of a process for conducting low temperature management of a solid state storage device in accordance with an embodiment of the present disclosure.

FIG. 2 is a flowchart of a process 200 for conducting low temperature management of a solid state storage device in accordance with an embodiment of the present disclosure. At block 202, a standby mode for low temperature management may be maintained until a host electronic system has been turned off. For example, the electronic system 100 may be an electronic system on a vehicle. When the vehicle is in the ignition on status, the electronic system 100 may be on and the solid state storage device 104 may perform its regular operations. The low temperature management features of the solid state storage device 104 may be in a standby mode (e.g., the timer 108 may be off and the temperature sensor 106 may be off or the temperature reading ignored). It should be noted that after the ignition is turned off, the solid state storage device 104 may enter the low temperature management mode, in which the timer 108 may be turned on and the temperature sensor 106 may be turned on. However, regular operations may be suspended to save power in the low temperature management mode. Therefore, the low temperature management mode may be a low power mode or a standby mode for regulator operations.

At block 204, a temperature reading from a temperature sensor may be checked. At block 206, it may be determined that the temperature reading is below a temperature threshold. In some embodiments, from the moment that the vehicle ignition is turned off, the temperature reading from the temperature sensor 106 may start to be monitored and compared to a temperature threshold level as part of operations of the low temperature management mode. For example, 0° C. may be used as a temperature threshold. If the temperature is found lower than the threshold level, the low-temperature management features may kick in (e.g., setting the time interval and starting the timer). In some embodiments, monitoring of the temperature reading may be performed by the storage controller 112. For example, after the host electronic system is turned off, the solid state storage device 104 may be configured into a low power mode in which a reduced number of power domains of the solid state storage device 104 may be kept on. The solid state storage device 104 may be configured to perform the temperature check with a low sampling frequency to minimize power consumption. Alternatively, the temperature monitoring may be done by the electronic control unit 102.

At block 208, a time interval may be set on a timer based on the temperature reading. In some embodiments, the time interval may be set on the timer 108 based on the temperature reading by the storage controller 112 or the electronic control unit 102. At block 210, a timer may be used to count how long the host electronic system has been turned off. In some embodiments, the timer 108 may count up (e.g., from zero counting towards the time interval). In some other embodiments, the timer 108 may count down (e.g., from the time interval counting towards zero).

At block 212, an interrupt may be sent to a storage controller from the timer when the timer counts to a time Interval. For example, when the timer 108 counts to the value of the time interval, an interrupt may be generated by the timer 108 and sent to the storage controller 112. At block 214, low-temperature management operations may be performed using power supplied by a backup battery. In some embodiments, the low-temperature management operations may include refresh and back-up operations to be performed by the storage controller 112 for data stored in the NVMs 116. In at least one embodiment, the low-temperature management operations may further include issuing user notifications (e.g., SMS, email, and/or mobile app messages).

In some embodiments, the process 200 may further include resetting the timer 108, restarting the time count and repeating the low-temperature management operations after another time interval. In one embodiment, while the timer 108 may be counting, the temperature reading from the temperature sensor 106 may be continuously monitored. If there is no significant change in temperature, the present time interval is maintained and the low-temperature management operations may be performed at the present time interval. If a significant change of temperature is recorded, the time interval value may be set or adjusted based on the new temperature reading and the low-temperature management operations may be performed at the new time interval. As an example, a significant change in temperature may be defined as a temperature change of 5° C. or more.

Figure 3:
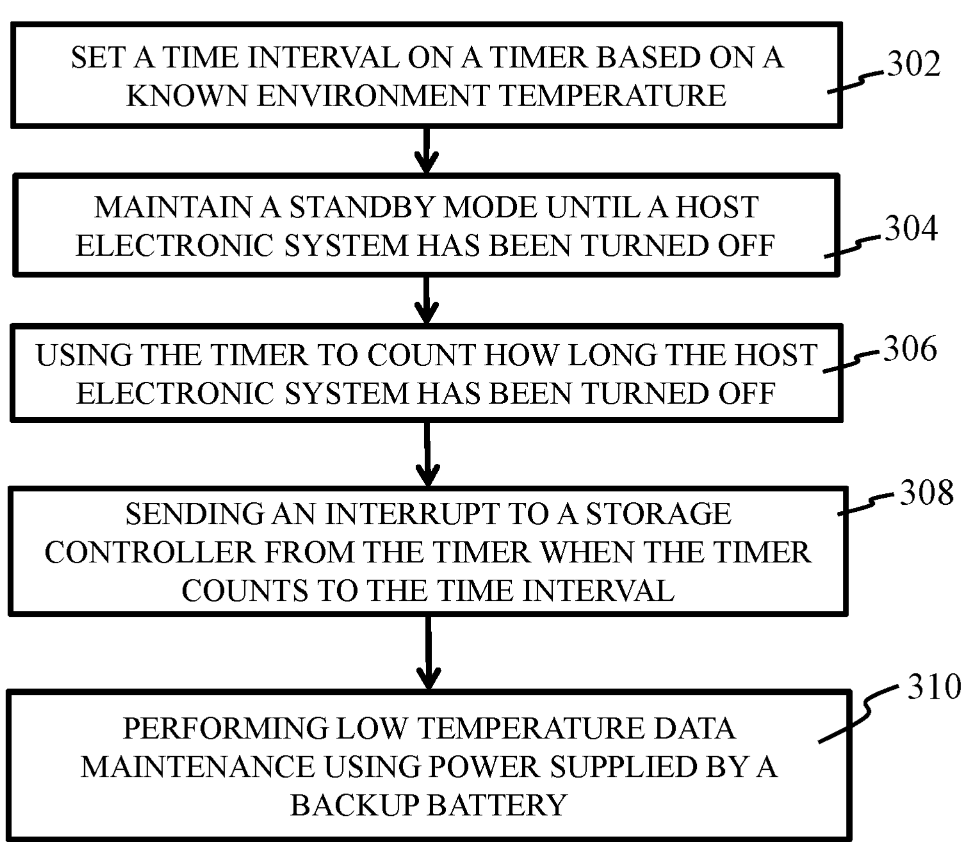
FIG. 3 is a flowchart of another process for conducting low temperature management of a solid state storage device in accordance with another embodiment of the present disclosure.

FIG. 3 is a flowchart of another process 300 for conducting low temperature management of a solid state storage device in accordance with another embodiment of the present disclosure. At block 302, a time interval may be set on a timer based on a known environment temperature. In some embodiments, the temperature sensor 106 may be one existing temperature sensor in the electronic system 100. For example, it is common for a modern vehicle to have a temperature sensor to measure environment temperature and display the measured environment temperature to drivers. This measured environment temperature may be used for setting the time interval for the timer 108. At block 304, a standby mode for low temperature management may be maintained until a host electronic system has been turned off. At block 306, the timer may be used to count how long the host electronic system has been turned off. At block 308, an interrupt may be sent to a storage controller from the timer when the timer counts to a time Interval. At block 310, low-temperature management operations may be performed using power supplied by a backup battery.

Operations in blocks 304, 306, 308 and 310 of the process 300 may be identical or similar to the operations in blocks

202, 210, 212 and 214 of the process 200. That is, in some embodiments that there is an existing knowledge of the environment temperature, the time interval of the timer 108 may be set according to the existing knowledge of the environment temperature before the low-temperature management features are started. Once the vehicle ignition is turned off, the timer 108 starts to count. When the end of time interval is reached, the refresh and back-up operations will be performed, and the user notifications are issued.

In some embodiments of the process 200 and the process 300, the timer 108 may start counting again for the next operation cycle after the interrupt has been sent or the low-temperature management operations have been performed. If the electronic system 100 is turned back on (e.g., the vehicle's ignition is turned on) in the middle of any time interval, the low temperature management features of the solid state storage device 104 may be put back to the standby mode for low temperature management (e.g., the timer is turned off).

In one exemplary embodiment, there is provided an apparatus that may comprise: a temperature sensor to generate a temperature reading, a timer configured with a time interval, a backup battery, one or more non-volatile memory devices and a storage controller. The storage controller may be configured to: maintain a standby mode for low temperature management until a host electronic system has been turned off and start the timer when the host electronic system is turned off, check the temperature reading from the temperature sensor when the host electronic system is turned off, determine that the temperature reading is below a temperature threshold, set the time interval on the timer based on the temperature reading, receive an interrupt from the timer when the timer counts to the time Interval, and perform low-temperature management operations for data stored in the one or more non-volatile memory devices using power supplied by the backup battery.

In one embodiment, the low-temperature management operations may include refresh and back-up data stored in the one or more non-volatile memory devices.

In one embodiment, the low-temperature management operations may further include sending one or more user notifications.

In one embodiment, for the low-temperature management operations, the storage controller may be further configured to prioritize and selectively back-up data for an operating system, critical programs and important user data.

In one embodiment, the storage controller may be further configured to use the timer to count how much time has passed since the low-temperature management operations have been performed and use another interrupt from the timer to activate the storage controller to repeat the low-temperature management operations.

In one embodiment, the storage controller may be further configured to determine that there is a significant temperature change when the temperature reading indicates that a temperature change has reached a temperature change threshold, and set a new value for the time interval based on the temperature change.

In one embodiment, the one or more non-volatile memory devices and the storage may be part of a solid state storage device and time interval may be further determined based on a variety of factors that represent a durability and lifetime of the solid state storage device.

In another exemplary embodiment, there is provided a method for managing a solid state storage device in a low temperature environment. The method may comprise: maintaining a standby mode for low temperature management until a host electronic system has been turned off, checking a temperature reading from a temperature sensor when the host electronic system is turned off, determining that the temperature reading is below a temperature threshold, setting a time interval on a timer based on the temperature reading, using the timer to count how long the host electronic system has been turned off, sending an interrupt to a storage controller of the solid state storage device from the timer when the timer counts to the time Interval and performing low-temperature management operations using power supplied by a backup battery.

In one embodiment, the low-temperature management operations may include refresh and back-up data stored in one or more non-volatile memory devices of the solid state storage device.

In one embodiment, the low-temperature management operations may further include sending one or more user notifications.

In one embodiment, for the low-temperature management operations, the storage controller may be configured to prioritize and selectively back-up data for an operating system, critical programs and important user data.

In one embodiment, the method may further comprise using the timer to count how much time has passed since the low-temperature management operations have been performed and sending another interrupt to activate the storage controller to repeat the low-temperature management operations.

In one embodiment, the method may further comprise determining that there is a significant temperature change when the temperature reading indicates that a temperature change has reached a temperature change threshold, and setting a new value for the time interval based on the temperature change.

In one embodiment, the time interval may be further determined based on a variety of factors that represent a durability and lifetime of the solid state storage device.

In yet another exemplary embodiment, there is provided a method for managing a solid state storage device in a low temperature environment. The method may comprise: setting a time interval on a timer based on a known environment temperature reading, maintaining a standby mode for low temperature management until a host electronic system has been turned off, using the timer to count how long the host electronic system has been turned off, sending an interrupt to a storage controller of the solid state storage device from the timer when the timer counts to the time Interval, and performing low-temperature management operations using power supplied by a backup battery.

In one embodiment, the low-temperature management operations may include refresh and back-up data stored in one or more non-volatile memory devices of the solid state storage device.

In one embodiment, the low-temperature management operations may further include sending one or more user notifications.

In one embodiment, for the low-temperature management operations, the storage controller may be configured to prioritize and selectively back-up data for an operating system, critical programs and important user data.

In one embodiment, the method may further comprise using the timer to count how much time has passed since the low-temperature management operations have been performed and sending another interrupt to activate the storage controller to repeat the low-temperature management operations.

In one embodiment, the time interval may be further determined based on a variety of factors that represent a durability and lifetime of the solid state storage device.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:

a temperature sensor;

a first timer;

a battery;

one or more non-volatile memory devices; and a storage controller;

wherein the first timer is configured to send a first interrupt to the storage controller when the first timer counts to a first time interval;

wherein the storage controller is configured to:

in response to a host electronic system of the apparatus being turned off and a temperature reading from the temperature sensor being below a temperature threshold, start the first timer;

in response to the first interrupt, perform low-temperature management operations for data stored in the one or more non-volatile memory devices using power supplied by the battery.

2. The apparatus of claim 1, wherein the low-temperature management operations comprise refreshing and backing up data stored in the one or more non-volatile memory devices.

3. The apparatus of claim 2, wherein the low-temperature management operations further comprise sending one or more user notifications.

4. The apparatus of claim 2, wherein the storage controller is configured to prioritize and selectively back up data for an operating system, critical programs and important user data.

5. The apparatus of claim 1, wherein the storage controller is further configured to:

after performing the low-temperature management operations, start a second timer, wherein the second timer is configured to send a second interrupt to the storage controller when the second timer counts to a second time interval;

in response to the second interrupt, perform the low-temperature management operations using power supplied by the battery.

6. The apparatus of claim 1, wherein the storage controller is configured to, in response to a temperature change reaching a temperature change threshold, set the first time interval based on the temperature change.

7. The apparatus of claim 1, wherein the first time interval is a function of factors that represent a durability and lifetime of the one or more non-volatile memory devices.

8. The apparatus of claim 1, wherein the storage controller is configured to reset the first timer in response to the first interrupt.

9. The apparatus of claim 5, wherein the storage controller is configured to reset the second timer in response to the second interrupt.

10. A vehicle, comprising the host electronic system and the apparatus of claim 1.

11. A method comprising:

in response to a host electronic system of a solid-state storage device being turned off and a temperature reading from a temperature sensor being below a temperature threshold, starting a first timer;

in response to the first timer counting to a first time interval, sending a first interrupt to a storage controller of the solid-state storage device;

wherein the first interrupt causes the storage controller to perform low-temperature management operations using power supplied by a battery.

12. The method of claim 11, wherein the low-temperature management operations comprise refreshing and backing up data stored in one or more non-volatile memory devices of the solid-state storage device.

13. The method of claim 12, wherein the low-temperature management operations further comprise sending one or more user notifications.

14. The method of claim 12, wherein the storage controller is configured to prioritize and selectively back up data for an operating system, critical programs and important user data.

15. The method of claim 11, further comprising:

in response to the storage controller performing the low-temperature management operations, starting a second timer;

in response to the second timer counting to a second time interval, sending a second interrupt to the storage controller;

wherein the second interrupt causes the storage controller to perform the low-temperature management operations using power supplied by the battery.

16. The method of claim 11, further comprising, in response to a temperature change reaching a temperature change threshold, setting the first time interval based on the temperature change.

17. The method of claim 11, wherein the first time interval is a function of factors that represent a durability and lifetime of the solid-state storage device.

18. The method of claim 11, wherein the first interrupt causes the storage controller to reset the first timer.

19. The method of claim 15, wherein the second interrupt causes the storage controller to reset the second timer.

20. A non-transitory computer-readable medium having instructions recorded thereon, the instructions when executed by a computer implementing the method of claim 11.

* * * * *